(12) United States Patent
Nakano (10) Patent No.: US 8,826,334 B2
(45) Date of Patent: Sep. 2, 2014

(54) TELEVISION RECEIVING APPARATUS AND METHOD FOR DISPLAYING AN ELECTRONIC PROGRAM GUIDE

(75) Inventor: Katsuya Nakano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 920 days.

(21) Appl. No.: 12/056,122

(22) Filed: Mar. 26, 2008

(65) Prior Publication Data

US 2008/0244652 A1     Oct. 2, 2008

(30) Foreign Application Priority Data

Mar. 28, 2007     (JP) ................................ 2007-084686

(51) Int. Cl.
G06F 3/00       (2006.01)
G06F 13/00      (2006.01)
H04N 5/445      (2011.01)

(52) U.S. Cl.
USPC ............... 725/40; 725/37; 725/39; 725/47; 725/136; 725/137; 725/139; 348/461; 348/468; 348/569

(58) Field of Classification Search
USPC .................... 725/39, 40, 37, 43, 47
See application file for complete search history.

(56) References Cited

U.S. PATENT DOCUMENTS 7,051,360 B1 *   5/2006   Ellis et al. .............. 725/136
2007/0211158 A1   9/2007   Icho

FOREIGN PATENT DOCUMENTS

| JP | 7-095492 A | 4/1995 |
| JP | 2002-369093 A | 12/2002 |
| JP | 2006-254023 A | 9/2006 |
| WO | 2005-122579 A1 | 12/2005 |

* cited by examiner

*Primary Examiner* — Kunal Langhnoja

(74) *Attorney, Agent, or Firm* — Canon USA, Inc., I.P. Division (57) ABSTRACT

A television receiving apparatus includes a receiving unit configured to receive a broadcasting program, a program information obtaining unit configured to obtain program information about the broadcasting program, a language setting unit configured to set a language used to display an Electronic Program Guide (EPG), a selection unit configured to select a program to be broadcasted in a language set by the language setting unit using the program information, and a program guide generating unit configured to generate the EPG using the program information, wherein the program guide generating unit is configured to generate the EPG that displays and identifies a program selected by the selection unit while not displaying a program that is not selected by the selection unit.

8 Claims, 7 Drawing Sheets

| | CH1 | CH2 | CH3 | CH4 |
|---|---|---|---|---|
| AM11 | CH1 Program 1A (Japanese) | CH2 Program 2A (Chinese) | CH3 Program 3A (Spanish) | CH4 Program 4A (Korea) |
| AM12 | CH1 Program 1B (English) | | CH3 Program 3B (Germany) | CH4 Program 4B (Spanish) |
| PM1 | CH1 Program 1C (French) | CH2 Program 2B (English) | CH3 Program 3C (English) | CH4 Program 4C (French) |
| PM2 | | | | |
| PM3 | CH1 Program 1D (Italian) | CH2 Program 2C (English) | | CH4 Program 4D (Japanese) |

FIG. 5

| | English CH1 | English CH2 | CH1 | CH2 | CH3 | CH4 |
|---|---|---|---|---|---|---|
| AM11 | | | CH1 Program 1A (Japanese) | CH2 Program 2A (Chinese) | CH3 Program 3A (Spanish) | CH4 Program 4A (Korea) |
| AM12 | CH1 Program 1B (English) | | CH1 Program 1B (English) | | CH3 Program 3B (Germany) | CH4 Program 3B (Spanish) |
| PM1 | | | CH1 Program 1C (French) | CH2 Program 2B (English) | CH3 Program 3C (English) | |
| PM2 | CH2 Program 2B (English) | CH3 Program 3C (English) | | | | CH4 Program 4C (French) |
| PM3 | CH2 Program 2C (English) | | CH1 Program 1C (Italian) | CH2 Program 2C (English) | | CH4 Program 4D (Japanese) |

TELEVISION RECEIVING APPARATUS AND METHOD FOR DISPLAYING AN ELECTRONIC PROGRAM GUIDE

BACKGROUND OF THE INVENTION

1. Field of the Invention

The present invention relates to a television receiving apparatus for receiving broadcast digital terrestrial or satellite signals, and for displaying an electronic program guide allowing a viewer to view the broadcast programs and offering the viewer broadcast program information. It also relates to a method of displaying the electronic program guide.

2. Description of the Related Art

A system for receiving broadcast digital television signals such as broadcasting satellite (BS) digital broadcasting, communication satellite (CS) digital broadcasting and digital terrestrial broadcasting has become increasingly popular. These kinds of digital broadcasting systems employ a moving picture experts group (MPEG) method of compression coding technology to send more information than the conventional analog broadcasting. For instance, an electronic program guide (EPG) is multiplexed into a broadcasting signal to be displayed on a television screen so that the viewer can easily select the desired program from the EPG. Further, the digital broadcasting system can secure more than 100 channels to broadcast a great number of programs.

Thanks to the multiplied channels of the broadcasting programs and globalization in recent years, programs broadcast in a variety of languages are available for the viewer in Japan. Thus, people from various countries can enjoy viewing programs broadcasted in their own languages. However, when a user does not understand the language used in a television menu, the user cannot easily operate the television set. Japanese Patent Application Laid-Open No. 07-095492 discusses a television apparatus displaying a language menu on a screen to allow a user to set a desired language, when the user first uses a television receiver.

However, while the conventional method can facilitate operation of the television set, it is very difficult to select a program to be broadcasted in a language desired by the viewer from among more than 100 multiple channels. Although a program search can retrieve a program based on language information, if the user does not understand the language used in an operation screen of the program search, the program search itself is troublesome.

SUMMARY OF THE INVENTION

The present invention is directed to a television receiving apparatus configured to allow a user to easily select a program broadcast in a desired language. Thus, a user who understands only a specific language can easily select the program to be broadcasted in the specific language.

According to an aspect of the present invention, a television receiving apparatus includes a receiver configured to receive a broadcast program, a program information obtaining unit configured to obtain program information relating to the broadcast program, a selection unit for selecting, using the program information, a program to be broadcast in a predetermined language, and a program guide generating unit for generating an electronic program guide using the program information. The program guide generating unit generates an electronic program guide including the program information for the selected program, wherein the electronic program guide presents the program information for the selected program such that the selected program is identified as a program to be broadcast in the predetermined language.

Further features and aspects of the present invention will become apparent from the following detailed description of exemplary embodiments.

BRIEF DESCRIPTION OF THE DRAWINGS

The accompanying drawings illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will now be described in detail with reference to the drawings.

First Exemplary Embodiment

Figure 1:
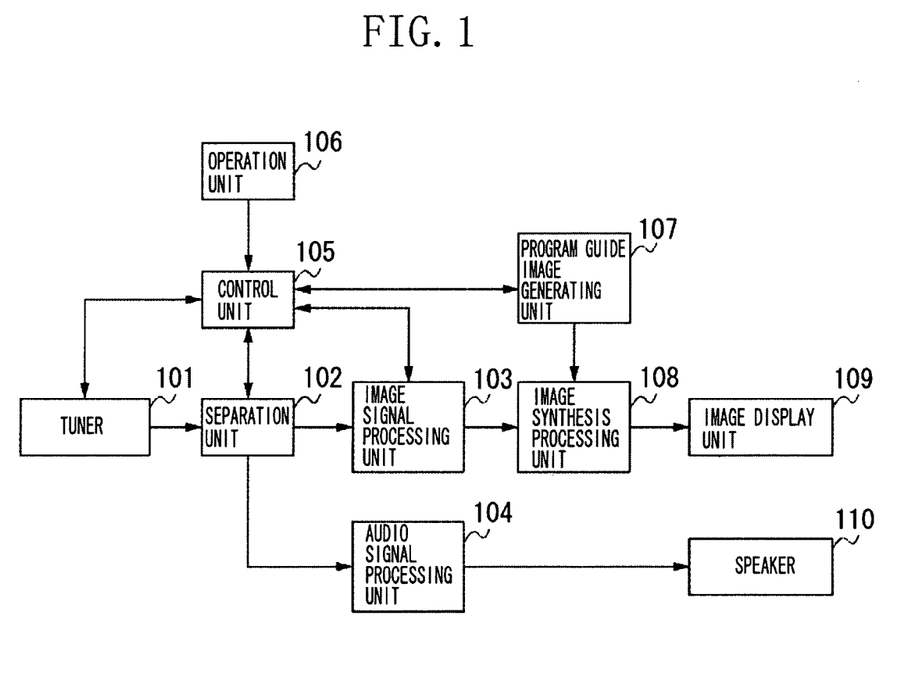
FIG. 1 is a block diagram illustrating a television receiving apparatus according to an exemplary embodiment of the present invention.

FIG. 1 is a block diagram illustrating a television receiving apparatus of an exemplary embodiment according to the present invention. A broadcast signal includes multiplexed program information having contents of each program. The contents of each program include information such as a program title, airtime, performers' names, program contents and a broadcast language.

A tuner 101 performs tuning on the broadcast signal received via an antenna responding to a control command from a control unit 105 to output a transport stream (TS). A separation unit 102 separates the TS output from the tuner 101 into image information, audio information, and program information. The image information is output to an image signal processing unit 103, the audio information is output to an audio signal processing unit 104, and the program information is output to the control unit 105 respectively. The image signal processing unit 103 decodes the image information and sends an image data to an image synthesis processing unit 108. The audio signal processing unit 104 performs decoding on an audio signal, performs digital/analog conversion on the decoded audio data, and sends the converted audio data to a speaker 110. The speaker 110 outputs audio based on the audio data. The control unit 105 sends a control command to each of the tuner 101, a program guide image generating unit 107, the image signal processing unit 103, and the separation unit 102 to control each of the blocks, according to an operation command input by a user and sent from an operation unit 106.

Further, based on the program information, the control unit 105 generates program guide generating data, and sends the program guide generating data to the program guide image generating unit 107. The operation unit 106 sends a command corresponding to an operation command input by the user (via an operation button provided in a main body of the apparatus or an operation button in a remote controller (not shown)) to the control unit 105. The program guide image generating unit 107 receives the program guide generating data input from the control unit 105, and generates a program guide image based on the program guide generating data.

The generated program guide image data is sent to an image synthesis processing unit 108. The image synthesis processing unit 108 image-synthesizes the image data input from the image signal processing unit 103 and the program guide image data input from the program guide image generating unit 107, and sends the synthesized image to an image display unit 109. The image display unit 109 displays the synthesized image as an EPG image on a screen based on synthesized image data from the image synthesis processing unit 108. At this point, a picture based on the image data is a reduced picture of the program selected in the EPG, which is displayed as a part of the EPG. The control unit 105 includes a program information obtaining unit, a selection unit configured to select a program, and a program guide generating unit.

Figure 3:
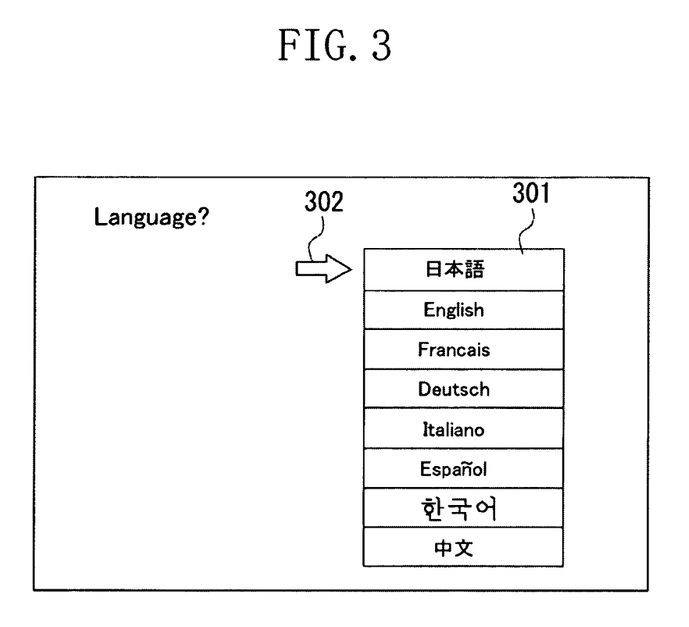
FIG. 3 is an explanatory diagram illustrating a language setting screen according to an exemplary embodiment of to the present invention.
Figure 6:
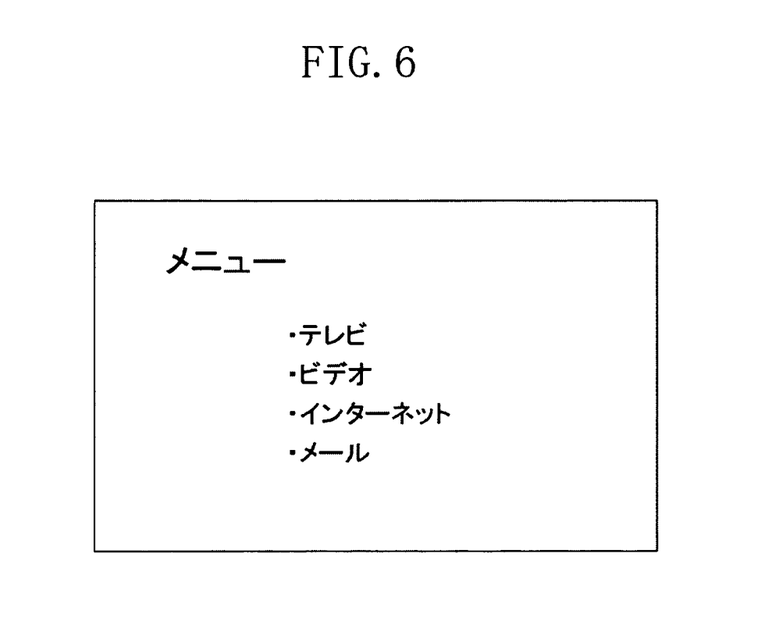
FIG. 6 is an explanatory diagram illustrating a menu display screen in Japanese according to an exemplary embodiment of the present invention.
Figure 7:
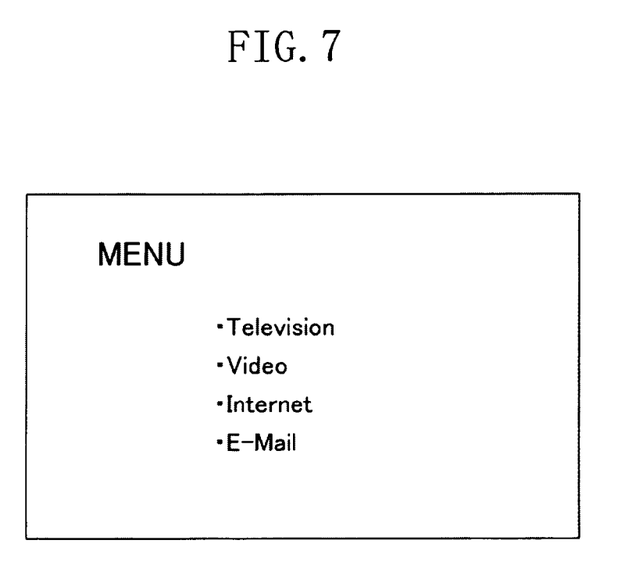
FIG. 7 is an explanatory diagram illustrating a menu display screen in English according to an exemplary embodiment of the present invention.

Next, the setting of a language used for displaying a user interface will be described referring to FIGS. 3, 6, and 7. FIG. 3 illustrates a display state of languages used to display the user interface in the television receiving apparatus. As a default, based on information of an area where the television receiving apparatus is placed, a language is set corresponding to the area. Settable language items 301 are displayed in each of the languages so that the user can easily make a selection, for example, "日本語" in Japanese, "English" in English, and "Deutsch" in German. The settable language items 301 may be displayed in any form that allows the user to easily make the selection, and a country code corresponding to each of the languages may also be displayed. A selection decision cursor 302 is moved up and down to select and set a language. FIG. 6 illustrates a menu display screen in which Japanese language is set in FIG. 3, and displays each of the items in Japanese. FIG. 7 illustrates a menu display screen in which English is set in FIG. 3.

Figure 4:
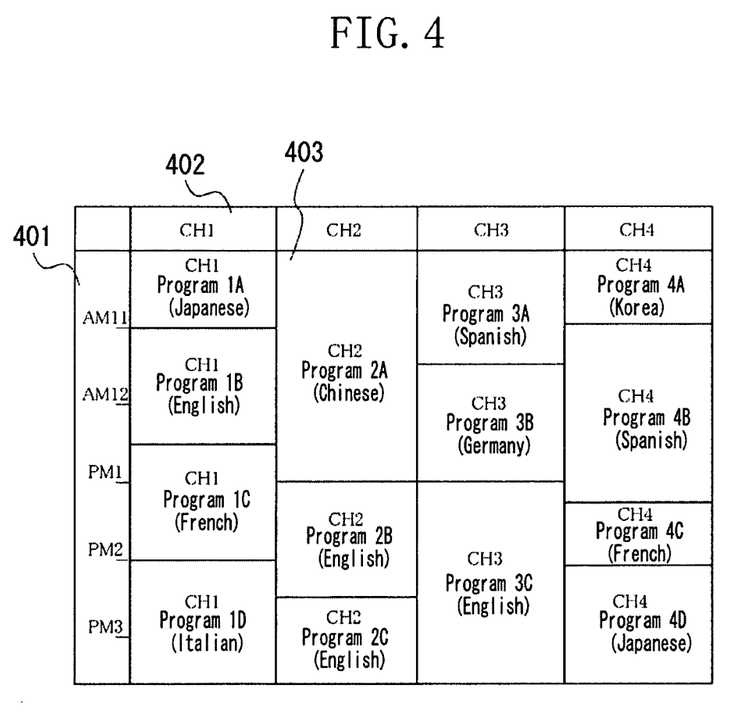
FIG. 4 is an explanatory diagram illustrating an EPG, in which a desired language is not set, according to an exemplary embodiment of the present invention.

Next, referring to FIG. 4, the EPG in which a desired language is not set will be described. The EPG is displayed in a matrix form, where a vertical axis 401 represents time and a lateral axis 402 represents channels. The EPG displays the program information about each program in a box 403.

The EPG screen can be controlled by a selection button and a decision button of a main body or a remote controller, and a restoring button for restoring from the EPG display screen to a broadcasting viewing screen (not shown). Further, the EPG screen is provided with a focus, which can be moved by the selection button for selecting up/down and left/right with respect to the box 403. When the restoring button is pressed down in a state in which the focus is placed on a channel to be selected, a command is sent from the control unit 105 to the tuner 101 so that image information and audio information of the selected channel are sent to the image signal processing unit 103 and the audio signal processing unit 104 respectively. Consequently, the user can view the image and audio of the selected channel. Further, when in the EPG screen, the decision button is pressed down in a state in which the focus is placed on a program, detailed information about the focused program can be displayed. Further, recording and viewing of the selected program can be reserved. The number of the channels to be displayed in the EPG can be selected according to user's purposes.

Next, referring to FIG. 5, the EPG in which a desired language is set will be described. Similar to FIG. 4, a vertical axis 501 represents time, and a lateral axis 502 represents channels. The EPG displays program information about each program in a box 503. A channel frame 504 is a channel (hereinafter, set language channel frame) in which programs to be broadcasted in a language set by the user are gathered. Program information about each program to be broadcasted in the language set by the user is displayed in a box 505. When no program is present that is broadcasted in the language set by the user, the set language channel frame 504 is not provided, but the channel numbers are displayed similar to the EPG in which the desired language is not set as shown in FIG. 4. At this point, a message notifying the user that no program is present that is broadcasted in the set language may be displayed in the EPG, or in a newly provided screen displaying the message.

When two or more programs are present that are broadcasted in the language set by the user, the number of columns of the set language channel frame 504 is displayed according to the number of programs. For instance, as shown in FIG. 5, when the user sets English for the language, two programs are present that are broadcasted in English after 1:00 pm. Then, the set language channel frame 504 displays two channels, "ENGLISH CH1" and "ENGLISH CH2".

In Japan, when Japanese language is set, since most of the programs are broadcasted in the set language, substantially as many set language channels as broadcasting channels are present. In this case, the EPG display is not simple enough for the user to easily understand. To avoid the problem, the user can previously set the maximum display number of the set language channel frame. When the number of the set language channel frame is larger than the maximum display number of the set language channel frame, a graphical user interface (GUI) is displayed to select whether the user sets the set language channel frame. At this point, the GUI may be displayed in the EPG or in a newly provided screen displaying the GUI. Alternatively, without producing a display for making a selection, the set language channel frame may be automatically arranged not to be provided. When the set language channel is not provided, the channel number is displayed similar to the EPG in which the language is not set as shown in FIG. 4. In this case, the control unit 105 serves as the display program number set unit configured to set the maximum display number.

According to the present exemplary embodiment, the program information about the program to be broadcasted in the set language is displayed separately from other channel frames as the set language channel frame. Alternatively, without setting a channel frame, colors or contrast for displaying boxes or program information may be changed to identify the program of the set language and other programs. In general, the electronic program guide presents the program information for the selected program in a first display format and presents the program information for the non-selected program in a second display format different from the first display format.

In the exemplary embodiment, the entire EPG is displayed in the language set by the user. However, in the EPG, only the set language channel may be displayed in the language set by the user.

Further, the broadcasting programs include programs broadcasted in two or more languages, for instance, as a primary audio program and a secondary audio program. From among the multi language broadcasting programs as described above, a secondary audio program that is broadcasted in a language set by a user, is also gathered into the set language channel frame 504 similar to a primary audio program that is broadcasted in a language set by the user. As to the secondary audio program that is broadcasted in the language set by the user, the language set by the user is automatically changed to the primary audio program when the program is viewed. Therefore, the user can view the broadcasting program in the desired language without troublesome operations such as audio changing.

Next, a processing flow performed by the control unit 105 when the EPG is generated will be described with reference to a flowchart of FIG. 2.

In step S201, the control unit 105 sets a language to be used for displaying a user interface in response to an operation by a user from the operation unit 106 or the remote controller. Upon receiving a language setting command input from the operation unit 106 or the remote controller, the control unit 105 controls each of the blocks to display the user interface using the set language. In order to display the screen for setting a language, the user may operate the operation unit 106 or the remote controller to select the language setting mode from a menu. Alternatively, a dedicated button for displaying the language setting screen may be provided in the operation unit 106 or the remote controller. The language setting screen shown in FIG. 3 includes the settable language items 301 and the selection decision cursor 302. Language names in the settable language items 301 are each displayed in the language corresponding to the language names. Thus, the user can easily select a language name from among the settable language items. The user presses down the selection button of the operation unit 106 or the remote controller to move the selection decision cursor 302, and then presses down the decision button at a position of a desired language to set a language selection.

In step S202, the control unit 105 obtains program information about each program from the separation unit 102. The program information is superimposed on a broadcast wave, and information from a received broadcast wave is separated by the separation unit 102 and sent to the control unit 105.

In step S203, the control unit 105 generates program guide generating data based on the program information obtained in step S202. The program information includes information about each program such as a program title, airtime, performers' names, program contents and a broadcast language. The information can be displayed as detailed information about the program by pressing down the decision button of the operation unit 106 or the remote controller while the program guide item is focused/selected in the EPG display screen.

In step S204, based on the information about the broadcast language included in the program information, the control unit 105 selects the program which is broadcasted in the language set in step S201. When the selected program is present (YES in step S204), the processing proceeds to step S205. When no selected program is present (NO in step S204), the process of generating the program guide generating data is ended. When no selected programs are present, a message indicating that selected programs are not present may be displayed in the EPG or in a newly provided screen displaying the message.

In step S205, the control unit 105 generates the program guide generating data in which the selected program is assigned to a set language channel frame that is newly generated. When two or more selected programs are present which are broadcast at overlapping time periods, the set language channel frame may be newly generated according to the number of the programs. In that case, prior to step S205, a step may be provided in which the maximum display number of the set language channel frames that are newly generated is set in the EPG. When the number of the selected programs to be broadcast at the same time is larger than the set maximum display number, a message may be displayed to prompt a user to determine whether or not the set language channel is generated.

In the exemplary embodiment, the EPG is generated using the program information superimposed on the broadcast wave. However, the present invention is not limited thereto, for instance, the program information may be obtained via an external network apart from the broadcast wave to generate the EPG. Further, not only the program information but also image and audio information about the broadcast program may be obtained via the external network. Furthermore, for instance, the image and audio information about the broadcast program is obtained from the broadcast wave, while the program information is obtained via the network. That is, each of the information may be obtained from different sources.

In the exemplary embodiment, the EPG is displayed in a matrix form, but may be displayed in a list form as an alternative.

Figure 5:
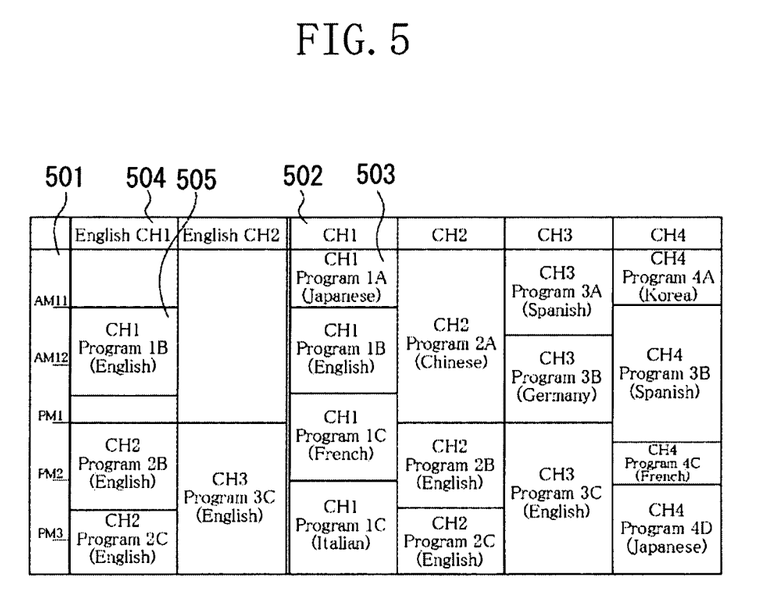
FIG. 5 is an explanatory diagram illustrating an EPG, in which a desired language is set, according to an exemplary embodiment of the present invention.

In the exemplary embodiment, as shown in FIG. 5, the program to be broadcast in the display language set by the user in the user interface and other programs are both displayed in the EPG. However, only the program broadcast in the language set by the user may be displayed in the EPG. Further, the EPG displaying only the program broadcast in the language set by the user and the EPG displaying only other programs may be displayed on different respective screens.

In the exemplary embodiment, in order to set a language, the user operates the operation unit 106 or the remote controller to display the language setting screen. Alternatively, when the television receiving apparatus is turned on, the language setting screen may be first displayed.

Figure 2:
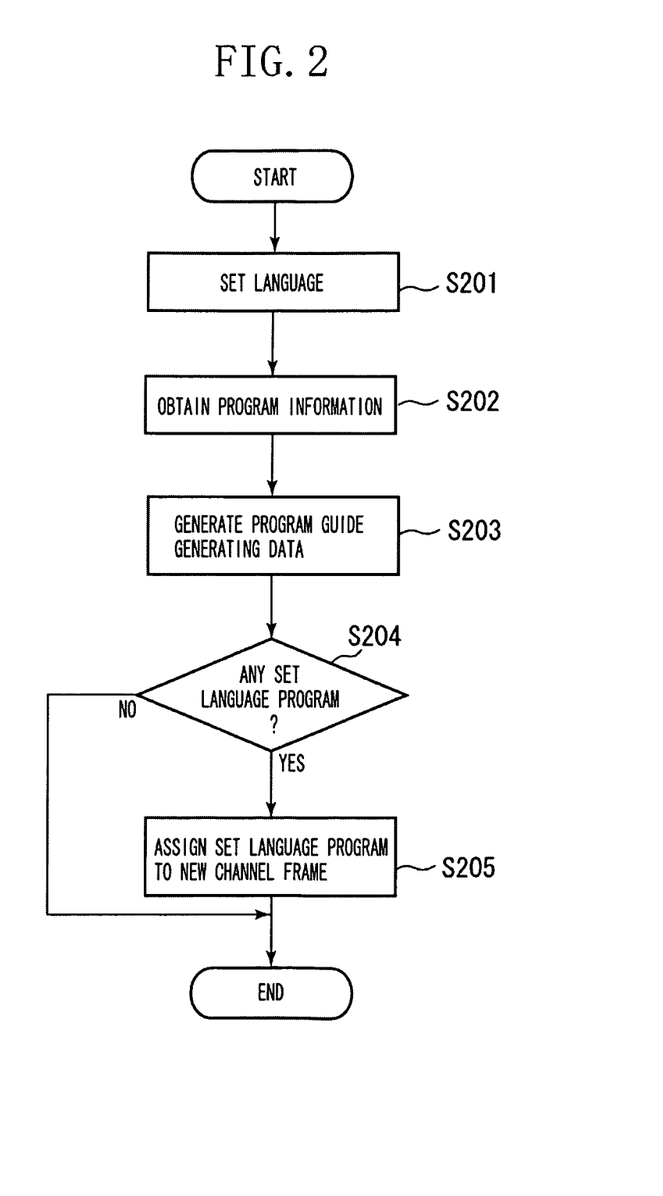
FIG. 2 is a flowchart illustrating a processing flow according to an exemplary embodiment of the present invention.

Further, in the flowchart as shown in FIG. 2, prior to step S201 for setting a language, step S202 for obtaining the program information about each program may be provided. After step S205 in which the selected program is assigned to the newly generated channel to generate the program guide generating data, step S203 for generating the normal program guide generating data may be provided.

A storage medium storing program code (software) that realizes functions of the present invention can be supplied to a system or a computer. A control unit (i.e., central processing unit (CPU) or micro processing unit (MPU)) of the system or the computer reads out the program code stored in the storage medium, and executes the instructions to accomplish the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-084686 filed Mar. 28, 2007, which is hereby incorporated by reference herein in its entirety.

What is claimed is:

1. A television receiving apparatus having a CPU, comprising:

a receiver configured to receive programs transmitted by a plurality of broadcast channels;
a program information obtaining unit configured to obtain program information relating to the programs;
a language setting unit configured to set a language used for an electronic program guide in accordance with an instruction from a user;
a program guide generating unit configured to generate an electronic program guide in accordance with the program information obtained by the program information obtaining unit and the language set by the language setting unit, the electronic program guide laying out program information on a two-dimensional coordinate plane having a channel axis and a time axis,
wherein the electronic program guide includes a first frame for displaying the program information of the programs transmitted by a first broadcast channel of the plurality of broadcast channels and a second frame for displaying the program information of the programs transmitted by a second broadcast channel of the plurality of broadcast channels,
wherein a program relating to the set language is included in the programs displayed in at least one of the first frame and the second frame, the program guide generating unit adds to the electronic program guide a third frame, which is different from the first frame and the second frame, for displaying program information of the program relating to the set language,
wherein a duplication of the program information of the program, which is displayed in at least one of the first frame and the second frame, relating to the set language is displayed in the third frame and program information of another program without relation to the set language is not displayed in the third frame,
wherein the first frame, the second frame and the third frame are simultaneously displayed in a direction of the channel axis, and
wherein program information of a first program relating to the set language and program information of a second program without relation to the set language are displayed in the first frame and program information of a third program relating to the set language and program information of a fourth program without relation to the set language are displayed in the second frame, a duplication of program information in the set language of the first and third programs is displayed in the third frame and program information of the second and fourth programs is not displayed in the third frame,
wherein the program information obtaining unit, the language setting unit and the program guide generating unit are implemented by the CPU.

2. The television receiving apparatus according to claim 1, wherein if a program relating to the set language is not included in a plurality of programs which are displayed in the electronic program guide and are transmitted by the plurality of broadcast channels, the program guide generating unit generates a screen notifying that there are no programs present relating to the set language.

3. The television receiving apparatus according to claim 1, wherein the program guide generating unit selects as the program relating to the set language a program including the set language as a secondary audio program.

4. The television receiving apparatus according to claim 3, wherein when program including the set language as a secondary audio program is designated from the electronic program guide, the secondary audio program included in the designated program is outputted as a primary audio program.

5. The television receiving apparatus according to claim 1, wherein when the television receiving apparatus is turned on, a language setting screen is displayed.

6. The television receiving apparatus according to claim 1, wherein if a program relating to the set language is transmitted by the second broadcast channel in a time period overlapping with the first program, the program guide generation unit adds a fourth frame for displaying the program relating to the set language to the electronic program guide, displays program information of a fifth program transmitted by the second broadcast channel in the time period overlapping with the first program in the second frame, and displays the program information of the fifth program in the fourth frame.

7. A method of displaying an electronic program guide for programs, the method comprising steps of:
obtaining program information relating to a program to be received;
setting a language used for an electronic program guide in accordance with an instruction from a user;
generating the electronic program guide in accordance with the program information obtained in the obtaining step and the language set in the language setting step, the electronic program guide laying out the program information on a two-dimensional coordinate plane having a channel axis and a time axis;
displaying, in a first frame of the electronic program guide, the program information of programs transmitted by a first broadcast channel, and in a second frame, the program information of programs transmitted by a second broadcast channel,
wherein a program relating to the set language is included in the programs displayed in at least one of the first frame or the second frame, displaying in a third frame, which is different from the first frame and the second frame, program information of the program relating to the set language,
wherein a duplication of the program information of the program, which is displayed in at least one of the first frame and the second frame, relating to the set language is displayed in the third frame and program information of another program without relation to the set language is not displayed in the third frame,
wherein simultaneously displaying the first frame, the second frame and the third frame in a direction of the channel axis, and
wherein program information of a first program relating to the set language and program information of a second program without relation to the set language are displayed in the first frame and program information of a third program relating to the set language and program information of a fourth program without relation to the set language displayed in the second frame, a duplication of program information in the set language of the first and third programs are displayed in the third frame and program information of the second and fourth programs is not displayed in the third frame.

8. A television receiving apparatus having a CPU, comprising:
a receiver configured to receive programs transmitted by a plurality of broadcast channels;
a program information obtaining unit configured to obtain program information relating to the programs;
a language setting unit configured to set a language used for an electronic program guide in accordance with an instruction from a user;
a program guide generating unit configured to generate the electronic program guide in accordance with the program information obtained by the program information obtaining unit and the language set by the language setting unit, the electronic program guide laying out program information on a two-dimensional coordinate plane having a channel axis and a time axis, wherein the electronic program guide includes a plurality of channel frames, a number of channel frames corresponds to a number of the plurality of broadcast channels, for displaying listings of the plurality of broadcast channels, wherein a program relating to the set language is included in at least one of the listings displayed in the plurality of channel frames, the program guide generating unit adds to the electronic program guide an additional frame, which is different from the plurality of channel frames, for displaying program information of the program relating to the set language, wherein a duplication of program information of the program, which is included in at least one of the listings displayed in the plurality of channel frames, relating to the set language is displayed in the additional frame and program information of another program without relation to the set language is not displayed in the additional frame, wherein the plurality of channel frames and the additional frame are simultaneously displayed in a direction of the channel axis, wherein the program information obtaining unit, the language setting unit and the program guide generating unit are implemented by the CPU.

* * * * *